3,236,688
PROCESS FOR CLEANING CHEMICAL PROCESSING EQUIPMENT
Henry Kahn, Grafton, Ohio, assignor to Goodrich-Gulf Chemicals, Inc., Cleveland, Ohio, a corporation of Delaware
No Drawing. Filed Sept. 27, 1962, Ser. No. 226,721
3 Claims. (Cl. 134—4)

This invention relates to the removal of undesirable contaminants from processing equipment. More particularly this invention relates to a methd for over-laying the interior of polymerization equipment with a detachable coating which may subsequently be removed to facilitate elimination of film formations and other deposits from the equipment.

Processes of every type and description are commonly carried out in large, stirred vessels, frequently provided with auxiliary equipment such as heat transfer coils which enable heat to be supplied or extracted from the contents of the vessels. Such processes, whether carried on in batch or continuous manner, in many cases eventually produce undesirable deposits on the surfaces of the equipment with which the reaction mixtures related to such processes come into contact. In addition to interfering with the efficient transfer of heat to and from the interior of the vessels, the unwanted deposits frequently have a tendency to deteriorate and to partially fragment, resulting in contamination of the reaction mixture and the products produced therein.

The above described problem is particularly prevalent in chemical processes, especially in polymerization type reactions. As is well-known, monomeric materials capable of the reaction are commonly polymerized to form a variety of products possessing a host of valuable characteristics. Seemingly inherent in many polymerization reactions, however, is the formation of tough films and other deposits on the interior surfaces of the equipment employed in carrying out such reactions. The films, which can be composed of the polymeric product itself or associated gel-like substances frequently formed during the course of such polymerizations are often times relatively insoluble in known solvents and of a type which cling tenaciously to the surfaces on which they have been deposited. Unfortunately, such phenomenon is often observed in the formation of stereoregular polymers produced with Ziegler-type organometallic catalysts, and coatings so generated are extremely difficult to remove. It is not uncommon to discover that the deposits must be manually cut from the walls and other surfaces of the process equipment or dislodged with the aid of rotary steel brushes. Not only are such methods laborious, time consuming and expensive, but in addition, the areas to be cleaned are often times relatively inaccessible and consequently may not be conveniently cleaned by the foregoing methods. A process by which such processing equipment could be easily cleaned would be of great advantage, therefore, in the chemical processing industries, particularly in polymerization reactions of the type above described.

Now a method has been found by which processing equipment may be readily cleaned. The process discovered is particularly adapted to the separation of adhering deposits formed in the course of polymerization reactions. The method of the invention, while making possible a highly efficient separation of undesirable films and other deposits from the interior surface of polymerization and other equipment, greatly minimizes the risk of damage to such equipment which can occur in the course of ordinary cleaning operations. Where carbon steel surfaces are present, the process actually appears to retard the formation of deposits. Furthermore, the process disclosed can readily be carried out and greatly facilitates the cleaning of surfaces relatively inaccessible to various other cleaning methods. In some instances, the separation of the unwanted deposits may be achieved without manual assistance, from remote location.

In accordance with the process of this invention, films and deposits formed on the surfaces of chemical processing and other equipment may be suitably removed by a process comprising the steps of coating the surfaces of such equipment with a readily meltable substance, carrying out the desired operation resulting in the formation of undesirable deposits, heating the equipment to the melting point of the coating substance so that adhesion of the deposit to the surfaces of the equipment is substantially destroyed, and subsequently removing the dislodged deposits from the interior of the processing equipment.

In carrying out the process contemplated by the invention, all surfaces of the equipment which it is desired to protect from the tenacious adherence of contaminating deposits are coated with a meltable substance such as, for instance, a suitable wax compound. Following coating, the operation contemplated is carried out in the equipment—either in a batch or continuous manner—until such time as there is formed in the interior of the equipment contaminating deposits on a scale sufficient to warrant removal. At such point, reaction in the equipment is discontinued, and heat is applied in the amount necessary to obtain melting of the protective coating and consequential substantial destruction of the adhesive forces maintaining the deposits on the interior surfaces of the equipment. The loosened deposits may then readily be separated from the protected surfaces and removed from the equipment.

The process of the invention finds utility in the protection of any equipment in which a reaction having deposit forming propensities is carried out. The invention is particularly adapted, however, to the protection of equipment in which polymerization reactions are conducted. Among those polymerizations which can result in deposits which it is ultimately necessary to remove may be mentioned, for example, the polymerization of ethylene to form polyethylene, the polymerization of monomeric vinyl chloride to produce polyvinyl chloride, and similar reactions. The process has been found to be of special benefit in removing the build-up, frequently deposited in the form of a film, which occurs in the production of stereoregular polymers such as cis-1,4-polybutadiene with Ziegler organometallic type catalysts. In addition, when coatings of the type contemplated herein are used to protect carbon steel surfaces contacted with reaction mixtures employed in Ziegler-style polymerizations, the tendency of deposits to form on such surfaces is remarkably reduced.

Any readily meltable substance, inert to the components of the reaction to be carried out and substantially insoluble in such components, which has a melting point higher than the temperature at which the reaction of the process is to be conducted is satisfactory for the purposes of the invention. Of particular use, and preferred in the invention, are any of the wax-like compounds having the necessary melt temperature, inertness and solubility characteristics required by the reaction to be conducted. Waxes which form substantially hard, solid coatings are of particular advantage for coating purposes; however, waxes which, even though relatively soft, retain structural integrity in their coating capacity under the reaction conditions are also suitable. Among materials operable for the purpose are animal waxes, vegetable waxes, paraffin waxes, synthetic waxes and similar substances which possess the necessary physical characteristics. Among suitable materials may be mentioned carnauba wax, ouricury wax, beeswax, spermaceti wax, certain long-chain polyethylene glycols, i.e. Carbowaxes, low molecular weight polyolefins such as, for example, polyethylene, paraffin waxes—including ordinary paraffin waxes as well as the microcrystalline waxes, and mixtures of any of the above. The use of a microcrystalline wax is particularly advantageous for the purpose, however, and a mixture of such a wax with beeswax produces a tough rather than brittle coating which is peculiarly adapted to use in the invention.

As mentioned above, choice of the coating material will depend upon the characteristics of the reaction mixture with which the coating is to come in contact. In general, however, it may be stated that the coating should be substantially insoluble in the reaction mixture and possess a melting point somewhat higher than the temperature at which the reaction is to be carried out. It is necessary, in addition, that the wax remain substantially chemically unaffected in the presence of the components of the reaction, that is, it should be substantially inert under the reaction conditions.

The protective coating may be applied in any convenient manner, and while the amount applied is not particularly critical, economic considerations dictate that as thin a coat as possible be applied to the surfaces to be protected. It is preferable that a sufficient amount of wax be used to obtain an insulating film over the entire area with substantially no areas of the surface remaining unprotected.

The waxes may, for instance, be dissolved in a suitable solvent to form a wax containing solution which can be subsequently applied to all surfaces where protection is required. A convenient method is to fill and then drain the equipment to be protected, thus leaving all interior surfaces coated with a uniform, protective wax film. Such a solution can, of course, be sprayed or brushed on with equally satisfactory results. Following coating, the solvent is normally removed through evaporation, a process which may be accelerated by heating the equipment to a temperature slightly below the melting point of the wax.

If a thicker protective film is required, the wax to be employed may be melted, and the surfaces exposed to deposit formation coated with the melted wax. Again, a convenient method comprises filling the equipment to be coated with the melted wax, draining the vessel and subsequently cooling it to obtain solidification and a substantially uniform, continuous coating.

While the above coating techniques may be employed with superior results, other methods such as, for instance, softening the wax and applying it with a brush, or otherwise, to areas—advantageously heated—which are to be protected, are equally effective.

Following the coating process, the reaction to be carried out in the equipment may be commenced immediately, no particular modifications of processing techniques being required due to the presence of the wax. It may, however, sometimes be necessary to make allowance for the change in the heat transfer coefficient resulting from the coating. Ordinary care should, of course, be exercised to avoid rough, physical contact with the coated surfaces because of the damage to the film which may result from such contacts. The reaction is usually continued until the time is reached at which deposits have progressed to the point where they constitute an impediment to satisfactory heat transfer, a source of product contamination, or their removal is otherwise desired. When such a condition is found to exist, the reaction is discontinued, and the wax film is sufficiently melted to substantially destroy supporting adhesion between the deposits and the surfaces of the equipment.

Melting of the wax and ultimate removal of the deposits from the equipment may be brought about in any of various ways. The method used will depend in part upon the nature of the surface from which the film is to be removed as well as on other factors such as, for example, the thickness of the film, the continuity (physical structure) or lack thereof of the deposits, etc.

In those instances where deposits have been formed on smooth broad surfaces, as where it occurs on the walls of a reactor vessel, and in those cases where the deposits are discontinuous, i.e., where there is no uniform coating over the entire surfaces of the equipment, it has been found convenient to fill the vessel with any suitable liquid, for instance water, and bring the latter to a temperature sufficient to melt the wax. When deposit adhesion is thus destroyed, the deposits tend to slough off the equipment surfaces into the water and in that condition are susceptible to easy removal. In such cases, agitation during heating assists in breaking residual adhesion and reducing the size of the detached contaminants so that they may be readily flushed from the equipment.

Contaminating deposits may be also loosened by simply heating the equipment to the melting point of the wax and maintaining the temperature until the wax is substantially all melted. Following this procedure, the deposits are found to be in a greatly loosened condition and may be stripped from the surfaces of the equipment with relative ease. Irrespective of which method is used to separate the deposits, following such treatment, the apparatus can be cleaned to the point where the formerly contaminated surfaces are substantially entirely free of the unwanted deposits. In such a condition, the equipment is ready for re-coating and resumption of the reaction.

The following examples, while not intended to be limiting in nature, are illustrative of the invention.

*Example I*

In this example, ethylene is polymerized in the presence of a Ziegler catalyst system to form a low-pressure type polyethylene product. The polymerization is carried out in an agitated, stainless steel enclosed vessel which is equipped with a jacket through which chilled brine can be passed for cooling purposes. The polymerization is performed in a batch process employing benzene as the inert polymerization medium, and a catalyst solution is used which contains approximately equimolar amounts of titanium tetrachloride and diethyl aluminum chloride in benzene, the solid components constituting about 20% by weight of the catalyst solution.

Prior to commencement of the reaction, a molten microcrystalline wax having a fusion point of approximately 89° C. is melted and used to fill the polymerization vessel, the latter being maintained all the while in a heated condition by passing steam through the vessel's jacket. Following filling of the reactor, the steam is turned off and cool water is passed into the vessel's jacket. Contemporaneously, a drain in the vessel is opened and the molten wax drained therefrom. Examination of the reactor following drainage shows a uniform layer of wax to have been deposited on all interior surfaces of the vessel to a thickness of approximately ¼ inch.

Following cooling, the reactor is filled with benzene, in the presence of an inert nitrogen atmosphere, and the catalyst solution and monomeric ethylene are metered into the vessel. The polymerization is carried on at a temperature of about 70° C., control being exercised by passing brine through the jacket as aforesaid. After approximately ten hours and a polymer content in the reactor of about 15%, the reaction is discontinued and the reactor drained. At this point, the interior of the vessel is seen to have a whitish to yellow film covering all surfaces exposed to the reaction mixture. Subsequent polymerizations are run in identical fashion until after six runs, or a total reaction time of about sixty hours, the heat transfer coefficient has become so poor that temperature control is interfered with.

At such point, following draining of the last reaction mixture, the vessel is filled with water, and steam is again introduced into the jacket. In such manner, the temperature of the reactor is raised to about 95° C., and the contents are simultaneously vigorously agitated. Following heating in the above fashion for ½ hour, the valve at the bottom of the vessel is opened and the contents discharged. The vessel is then opened, and the relatively small amount of deposits still adhering are easily loosened and removed from the vessel, leaving the latter in a substantially clean, film-free condition.

*Example II*

In this example, a continuous polymerization is conducted to produce an SBR type synthetic elastomer. The polymerization reaction is carried out in a series of twelve reactor vessels each of which is connected to the other so that contents of the first vessel overflow into the second, and from there to the third, etc. Each of the reactors is stirred with a driven agitator, and each is of glass-lined construction having a capacity of 3,750 gallons. Temperature control of the reaction is achieved by passing a chilled brine solution through the jacket surrounding each of the reactors.

Into the first of these reactors, in the course of the reaction, is continuously fed a soap solution made up of potassium chloride, potassium stearate and a stabilizer consisting of sodium salts of polymerized alkyl naphthalene sulfonic acid in water; a modifier solution containing a mercaptan modifier dissolved in styrene; an aqueous solution of sodium hydrosulphite; and an activator solution which includes sodium formaldehyde sulfoxylate in combination with a chelated iron compound. Also added to the first reactor are the monomers, i.e., styrene and butadiene, and a catalyst compound—diisopropyl benzene hydroperoxide. The reaction, which is controlled at a temperature of about 5° C., is carried out in a continuous manner, the mixture proceeding as aforesaid from one reactor vessel to the next. The reaction mixture leaving the last polymerization vessel is shortstopped, that is, the polymerization is terminated with a polysulphide-carbamate water solution and ultimately coagulated to produce the desired elastomeric product.

Following a continuous run of five months, the reaction is discontinued and the reaction vessels drained and examined. A very heavy coat, in some cases several inches thick, of coagulum, i.e., precipitated rubber, is observed to have been deposited on the lower walls and bottom of the vessels. Elimination of the deposits is accomplished by lowering men into the vessels to tear the rubber from the contaminated surfaces. The removal is accomplished with a cargo type hook and a two foot long rubber knife by combined pulling and cutting, a process which is not only laborious but one requiring many hours to accomplish.

A substantially similar run is carried out in which, however, the reactors are filled (and subsequently drained) with a microcrystalline wax of the type used in Example I, prior to the polymerization, thus leaving a uniform protective wax coating on all interior surfaces of the vessels. Polymerization is carried out in the reactor vessels for approximately five months before the heat transfer capability is such that cleaning of the tanks become desirable. At this point the reaction is discontinued; the contents of the vessels are drained, and steam is introduced into the jacket of the vessel until the latter's temperature is raised to approximately 100° C. Following heating for a period of thirty minutes, the flow of steam is shut off, and the reaction vessel cooled to the point at which access is possible. Upon entering the vessel, the rubber deposits are found to be in a greatly loosened condition, and the same can be readily stripped from the walls with a minimum amount of time and effort. The cleaning of the vessel in this run is accomplished in a fraction of the time required in conducting ordinary polymerization clean-up procedures.

*EXample III*

In an additional experiment, the cleaning process of the invention is carried out in connection with a process for manufacturing cis-1,4-polybutadiene. In the experiment, the reaction is conducted in a series of three, fifty-gallon, glass-lined reactor vessels each of which is fitted with a stainless steel cooling coil and a driven agitator. The reaction is carried out in a continuous fashion, the polymerization mixture being passed in series fashion throughout the reactor chain. Temperature control is maintained by means of a brine solution which is pumped through the heat transfer coils suspended in the interior of the vessels.

Incorporated in the first polymerization vessel is a reaction mixture comprising a cobalt dioctoate/diethyl aluminum chloride catalyst system, a butene-1/benzene polymerization medium, a water modifier and 1,3-butadiene monomer. The polymerization initiated in the first vessel is carried on throughout all of the subsequent reactors and the reaction mixture leaving the third vessel shortstopped by the addition of acetone. The inactivated polymer is subsequently "worked-up," i.e., precipitated from solution, washed and dried.

The foregoing polymerization reaction is continued for a period of approximately 120 hours at which time the pressure drop across the vessels becomes so high that a shut-down for cleaning is required. Upon draining and opening the reactors, a heavy coating of a gel-like polymer is found to have formed on the walls and heat transfer coils of the reactors as well as in the pipes connecting the reactors. Cleaning the equipment necessitates removing the tops of the reactors and scraping the coated surfaces repeatedly until the gel deposits have been removed, a process requiring the services of two men over a period of several days to accomplish.

Another experiment is conducted in identical fashion in which, however, the equipment is coated prior to the polymerization with a 3 to 1, by weight, mixture of a microcrystalline wax of the type employed in Example II and beeswax. The coating process is conducted in the same manner used to coat the equipment described in the second example. Following formation of the gel deposits the reactors are drained, filled with water, and heat is introduced into the coils of the vessels for a period of twenty-four hours. During this operation, the temperature is controlled at about 95° C., and the contents of the vessels are vigorously agitated. Following the heating period, the gel deposits are found to have been generally loosened, and in most area, the deposits have been completely separated from the surfaces to which they were formerly fastened and are in a condition which permits them to be flushed from the equipment. The process results in the cleaning of the vessels in substantially less time than otherwise would be required, and the quality of the cleaning is considerably improved.

*Example IV*

Still another experiment is carried out employing equipment substantially the same as that used in Example III, the sole difference being that the heat transfer coils suspended in the interior of the reaction vessels are fabricated from carbon steel rather than the stainless steel previously used.

A Ziegler style polymerization of 1,3-butadiene is conducted in the equipment to produce a substantially all cis-1,4-polybutadiene product, all techniques employed being identical with those used in Example III. The polymerization is carried out in a continuous manner for a period of approximately two weeks before the pressure drop throughout the reactor chain necessitates a shut-down of operations for cleaning purposes. Upon examination of the interior of the reactor vessels, the carbon steel coils are discovered to be almost completely free of gel deposits although the walls of the vessels show the amount normally expected following polymerization in a Ziegler system for the period during which the reaction has been run. The sharply reduced formation of gel on the carbon steel heat transfer coils is particularly surprising since ordinarily, such coils undergo a deposit formation so tenaciously adherent that the deposits must be burned off.

As in the case of the preceding examples, heat is applied to the vessels through the introduction of steam to the vessels' coils until the wax coating has been substantially melted. Again, the deposits are found to be greatly loosened, and the same are readily separated from the contaminated surfaces.

What is claimed is:

1. A process for cleaning chemical processing equipment employed in conducting polymerization reactions comprising the steps of initially coating the interior surfaces of the processing equipment with a mixture of microcrystalline wax and beeswax and subsequently heating the processing equipment to a temperature at which the wax coating is melted thereby substantially loosening contaminants formed during the polymerization reaction conducted in the coated equipment from the surfaces of the equipment, and then removing the loosened contaminants from said equipment so as to produce substantially clean, deposit-free processing equipment.

2. A process according to claim 1 in which about three parts by weight of microcrystalline wax are used for each part by weight of beeswax employed.

3. A process for cleaning chemical processing equipment employed in the manufacture of cis-1,4-polybutadiene type products comprising the steps of initially coating the interior surfaces of the processing equipment with a mixture consisting of a microcrystalline wax having a melt temperature of about 90° C. and beeswax, 3 parts by weight of the microcrystalline wax being used for each part by weight of beeswax so employed, thereafter heating the processing equipment to a temperature at which the wax coating is melted thereby substantially loosening contaminants formed during the polymerization reaction conducted in the coated equipment from the surfaces of said equipment, and then removing the contaminants from said equipment so as to produce substantially clean, deposit-free processing equipment.

References Cited by the Examiner

UNITED STATES PATENTS

| | | | |
|---|---|---|---|
| 2,563,499 | 8/1951 | Smith | 117—6 X |
| 2,668,782 | 2/1954 | Gross | 117—97 |
| 2,811,456 | 10/1957 | Coleman et al. | 117—6 X |
| 2,934,235 | 4/1960 | Maneri | 117—97 X |
| 2,971,883 | 2/1961 | Swinyar | 117—97 X |
| 2,978,387 | 4/1961 | Chapman et al. | 117—97 X |
| 2,986,471 | 5/1961 | Rudd | 117—6 X |
| 2,991,188 | 7/1961 | Wing et al. | 117—6 X |

FOREIGN PATENTS 121,763   8/1946   Australia.

MORRIS O. WOLK, *Primary Examiner.*

J. ZATARGA, *Assistant Examiner.*